United States Patent
Acharya et al.

(10) Patent No.: US 9,043,415 B2
(45) Date of Patent: May 26, 2015

(54) MANAGING A SUBSCRIPTION HIERARCHY IN PRESENCE SYSTEMS

(75) Inventors: Arup Acharya, Nanuet, NY (US); Nilanjan Banerjee, West Bengal (IN); Shachi Sharma, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 13/467,152

(22) Filed: May 9, 2012

(65) Prior Publication Data

US 2013/0304885 A1   Nov. 14, 2013

(51) Int. Cl.
*G06F 15/16* (2006.01)
*H04L 29/08* (2006.01)

(52) U.S. Cl.
CPC ...................... *H04L 67/24* (2013.01)

(58) Field of Classification Search
CPC ....... H04L 67/24; H04L 67/306; H04L 67/28; H04L 67/2838
USPC ................. 709/223–227, 204–207
See application file for complete search history.

(56) References Cited

U.S. PATENT DOCUMENTS

| | | | |
|---|---|---|---|
| 7,668,133 B2 | 2/2010 | Schmidt et al. | |
| 7,796,739 B2 | 9/2010 | Fukazawa | |
| 7,885,191 B2 | 2/2011 | Isomura et al. | |
| 8,484,337 B2 * | 7/2013 | Maeda et al. | 709/224 |
| 2006/0253455 A1 * | 11/2006 | Potra et al. | 707/10 |
| 2006/0280166 A1 * | 12/2006 | Morris | 370/352 |
| 2007/0150605 A1 | 6/2007 | Christoffersson et al. | |
| 2008/0034078 A1 * | 2/2008 | Sano et al. | 709/223 |
| 2008/0108332 A1 | 5/2008 | Tian et al. | |
| 2008/0133645 A1 | 6/2008 | Fridman et al. | |
| 2010/0049846 A1 | 2/2010 | Ballette et al. | |
| 2010/0077018 A1 | 3/2010 | Acharya et al. | |
| 2011/0250895 A1 | 10/2011 | Wohlert et al. | |
| 2011/0252141 A1 * | 10/2011 | Boberg et al. | 709/226 |

FOREIGN PATENT DOCUMENTS

WO    2008086927 A2    7/2008

OTHER PUBLICATIONS

Liao et al., A Token-Bucket Based Notification Traffic Control Mechanism for IMS Presence Service, Computer Communications 34 (2011) 1243-1257.
Chi et al., IMS Presence Server: Traffic Analysis & Performance Modelling, ICNP, 2008.

(Continued)

*Primary Examiner* — Chirag R Patel
(74) *Attorney, Agent, or Firm* — Ryan, Mason & Lewis, LLP

(57) ABSTRACT

A method, an apparatus and an article of manufacture for managing a subscription hierarchy in a presence system. The method includes receiving a presence information request within a presence server, wherein the request is one of a subscription request and an un-subscribe request, determining if the request corresponds to an existing subscriber in the presence server, and if so, sending a redirect message to the existing subscriber, and if not, processing the request within the presence server, and enhancing functionality of subscribers to accept and handle subscription and un-subscribe requests.

20 Claims, 5 Drawing Sheets

(56) References Cited

OTHER PUBLICATIONS

Khartabi et al., Functional Description of Event Notification Filtering, RFC#4660, Sep. 2006.

Lonnfords et al., Session Initiation Protocol (SIP) Extension for Partial Notification of Presence Information, RFC #5263, Sep. 2008.

* cited by examiner

MANAGING A SUBSCRIPTION HIERARCHY IN PRESENCE SYSTEMS

FIELD OF THE INVENTION

Embodiments of the invention generally relate to information technology, and, more particularly, to presence systems.

BACKGROUND

Presence includes the ability and willingness to communicate using a variety of devices and media. Presence information can include location, preferred communication mode, current mood and activity, phone status, user-specified status, expertise, etc. Presence information is utilized by enterprises as well as service providers.

A presentity is a source of presence information, and can represent a user, a group of users, or a program. A watcher or subscriber can include a requester of presence and/or information about a presentity. Additionally, a presence server (PS) includes a repository of presence information of some or all presentities in a domain. A presence server can handle messages such as, for example, SUBSCRIBE, PUBLISH and NOTIFY.

Traditional use of presence information has primarily been limited to Instant Messenger and related services. The usage of presence in advanced systems such as social networks has resulted in an increase in messaging load within presence-based networks as well as on nodes such as presence servers. Factors affecting load on presence servers can include request rate; that is, the number of messages received and distributed by the presence server per second. Additionally, the number of PUBLISH messages received depends on the average number of presentities and their PUBLISH rates. Also, the number of SUBSCRIBE messages received and NOTIFY messages sent are factors of the number of watchers for each presentity.

Other factors affecting load on presence servers can include filter document size or the number of rules. Every notification is generated after performing a rule matching process and applying the matched filter rules. The processing of this step depends on the number of rules in the policy document of the presentity. Additionally, a consideration includes the type of composition policies that the server supports and application of the policies (that is, a different policy being used on a per presentity basis or applied globally on the server for all presentities).

Further, the size of a watcher filter sent by the watcher in a SUBSCRIBE message affects both the processing and amount of traffic generated. Additionally, a partial notification mechanism can be used to conserve bandwidth by sending only the changes in the presence document to the watchers. The server can then compare the updated document with the old document for the presentities and generate the partial presence document.

Analysis of traffic in presence systems has shown that the NOTIFY messages often account for the largest portion of the traffic load on a presence server, and refreshing SUBSCRIBE messages often accounts for the second largest load on the presence server followed by the PUBLISH load.

Existing approaches attempting to handle load on presence servers include load balancing, where multiple physical servers share the load. Such an approach, however, is cost ineffective and also is not a scalable solution to meet growing demands. Other existing approaches include virtual presence, wherein a middleware subscribes to a presence server on behalf of a set of watchers.

SUMMARY

In one aspect of the present invention, techniques for managing a subscription hierarchy in presence systems are provided. An exemplary computer-implemented method for managing a subscription hierarchy in a presence system can include steps of receiving a presence information request within a presence server, wherein the request is one of a subscription request and an un-subscribe request, determining if the request corresponds to an existing subscriber in the presence server, and if so, sending a redirect message to the existing subscriber, and if not, processing the request within the presence server, and enhancing functionality of subscribers to accept and handle subscription and un-subscribe requests.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes creating autonomic subscription hierarchies in presence systems. Accordingly, at least one embodiment of the invention includes a method and apparatus by which presence servers and subscribers/watchers autonomously create and manage subscription hierarchies in a network. This results in distribution of load among the presence server and the subscribers.

At least one embodiment of the invention requires subscribers and/or watchers to be capable of accepting subscriptions and sending notifications. The subscribers should manage and maintain memory to store presence information.

Additionally, an aspect of the invention includes a presence server implementing configurable logic on the basis of which subscription hierarchies are created. This logic can be applicable to situations such as when the number of subscriptions for a presentity or resource list cross a pre-defined threshold, when subscribers interested in the same presence attributes of a presentity or resource list are in the same hierarchy, etc. Further, in at least one embodiment of the invention, presence servers maintain the book-keeping of all subscriptions and the subscription hierarchy.

As detailed herein, aspects of the invention include dynamically creating and autonomously managing subscription hierarchies with the presence server as the single controller. At least one embodiment of the invention is scalable where height and breadth of the hierarchy can be controlled by presence server. Additionally, the rules and policies to form hierarchies can be configurable inside a presence server as well.

Figure 1:
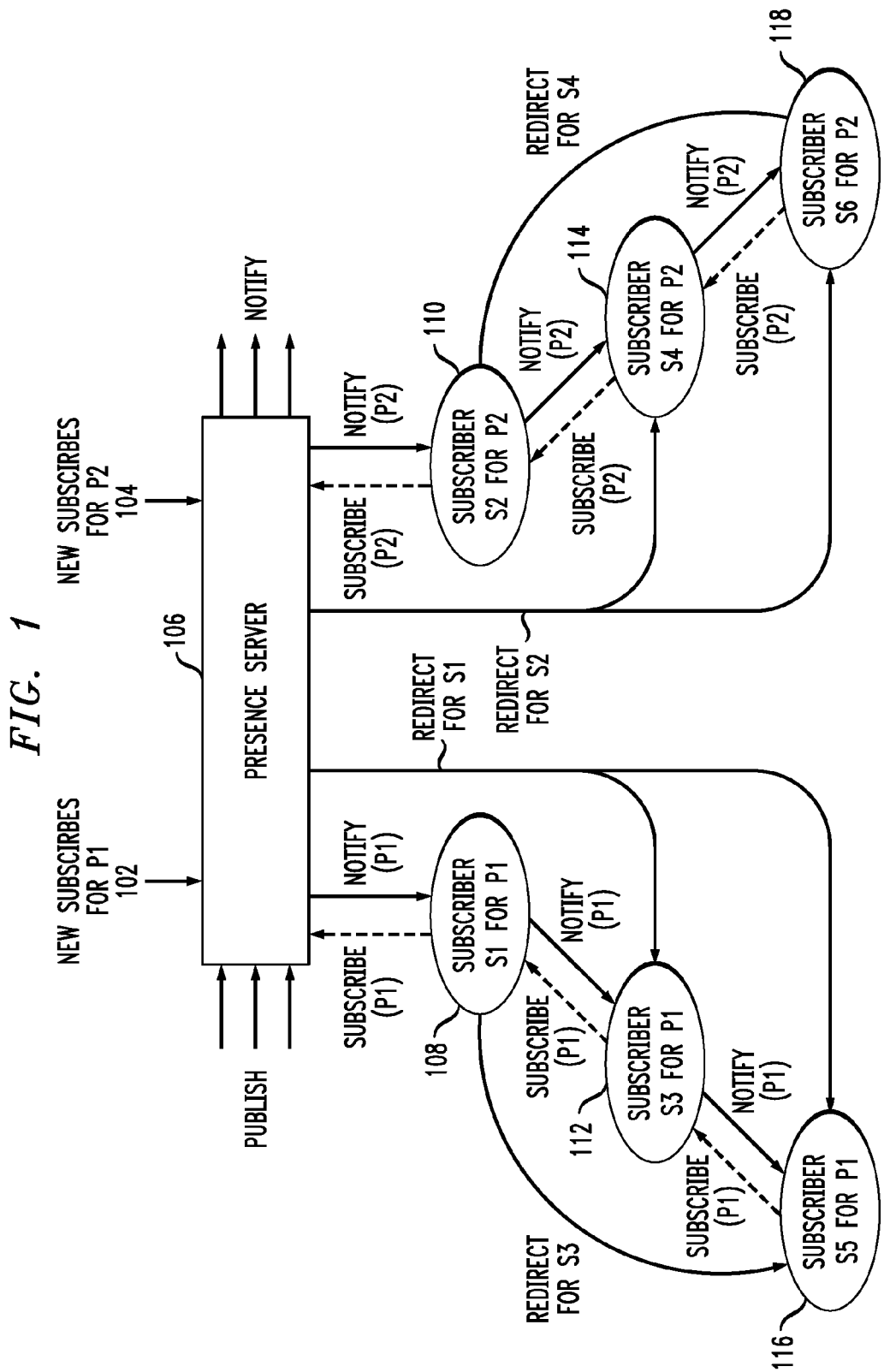
FIG. 1 is a diagram illustrating one hierarchy per presentity, according to an embodiment of the present invention.

FIG. 1 is a diagram illustrating a one hierarchy per presentity system, according to an embodiment of the present invention. By way of illustration, FIG. 1 depicts new subscribers (subscriptions) 102 for a first presentity (P1) and new subscribers 104 for a second presentity (P2), which are sent to presence server (PS) 106. As depicted in FIG. 1, presence server 106 receives publish messages and outputs notify messages.

Additionally, FIG. 1 depicts a subscriber (S1) 108 for P1, a subscriber (S3) 112 for P1, and a subscriber (S5) 116 for P1. Also, FIG. 1 depicts a subscriber (S2) 110 for P2, a subscriber (S4) 114 for P2, and a subscriber (S6) 118 for P2.

When presence server 106 receives a new SUBSCRIBE message for presentity P1, it checks in its database to determine if there already exists a subscription and hierarchy for P1 and further determines if the new subscription is to be redirected to (S1) 108 or (S3) 112 or (S5) 116. Presence server 106 then redirects the new subscription request to the chosen subscriber for handling (for example, (S5) 116). If there is any change in the presence status of presentity P1 in the presence server—that is, the presence server receives a new PUBLISH for P1—the presence server only notifies (S1) 108 and the dissemination of new presence data to other subscribers is the responsibility of (S1) 108. The subscriber (S1) 108 may again redirect the request to other subscriber (S3) 112 and so on. Similarly, for presentity P2, the presence server maintains a separate hierarchy.

Figure 2:
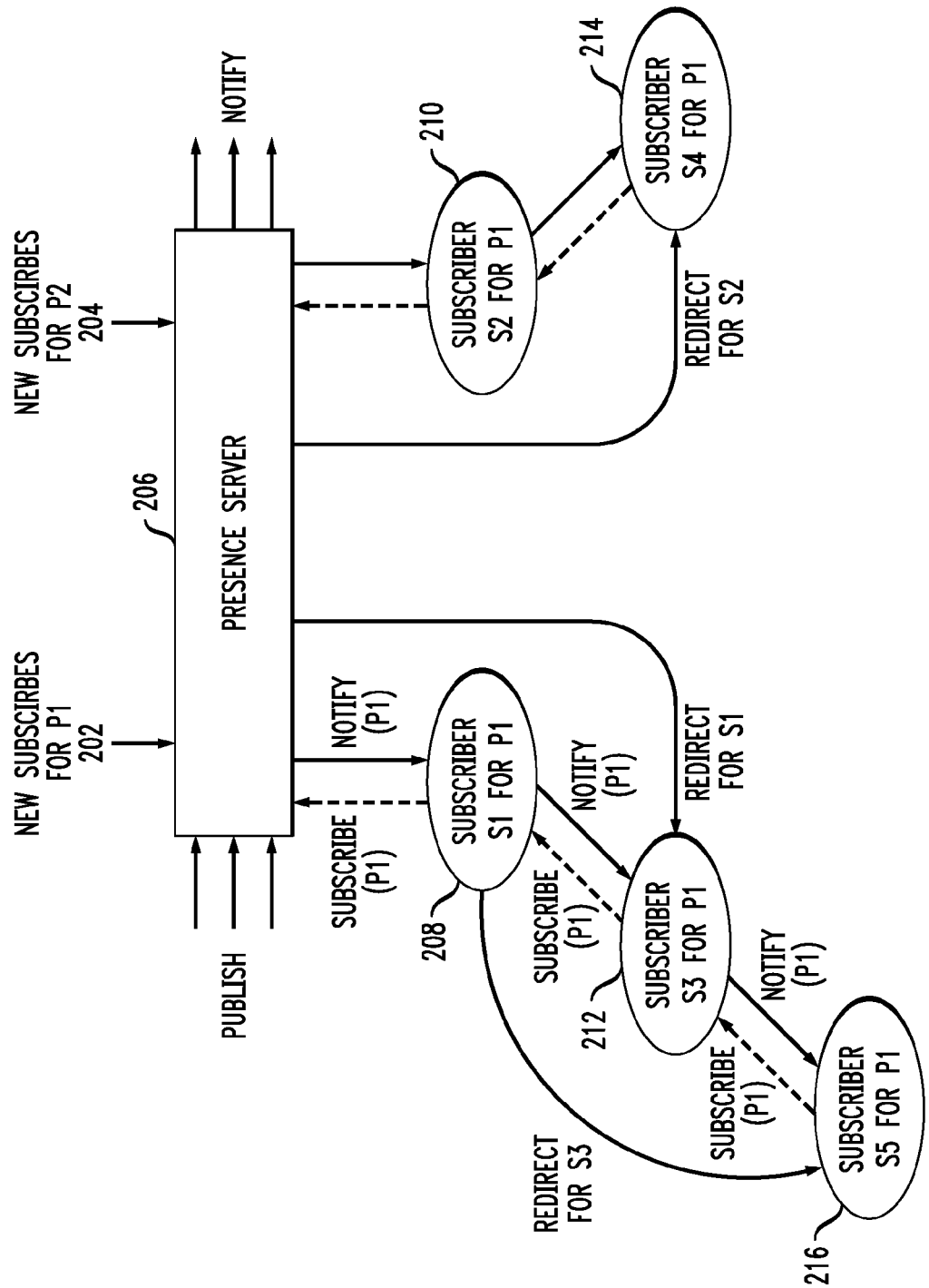
FIG. 2 is a diagram illustrating a system with multiple hierarchies for a presentity, according to an embodiment of the present invention.

FIG. 2 is a diagram illustrating a system with multiple hierarchies for a presentity, according to an embodiment of the present invention. By way of illustration, FIG. 2 depicts new subscribers (subscriptions) 202 for a first presentity (P1) and new subscribers 204 for a second presentity (P2), which are sent to presence server (PS) 206. As depicted in FIG. 2, presence server 206 receives publish messages and outputs notify messages.

Further, FIG. 2 depicts a subscriber (S1) 208 for P1, a subscriber (S3) 212 for P1, and a subscriber (S5) 216 for P1. Also, FIG. 2 depicts a subscriber (S2) 210 for P1, and a subscriber (S4) 214 for P1. When presence server 206 receives a new SUBSCRIBE message for presentity P1, it checks in its database to determine if there already exists a subscription and hierarchies for P1 and further determines if the new subscription is to be redirected to (S1) 208 or (S3) 212 or (S5) 216 or S2 (210) or S4 (214). The presence server then redirects the new subscription request to the chosen subscriber for handling (for example, (S5) 216). If there is any change in the presence status of presentity P1 in the presence server—that is, the presence server receives a new PUBLISH for P1—the presence server notifies (S1) 208 and (S2) 210. The dissemination of new presence data is the responsibility of (S1) 208 and (S2) 210.

Figure 3:
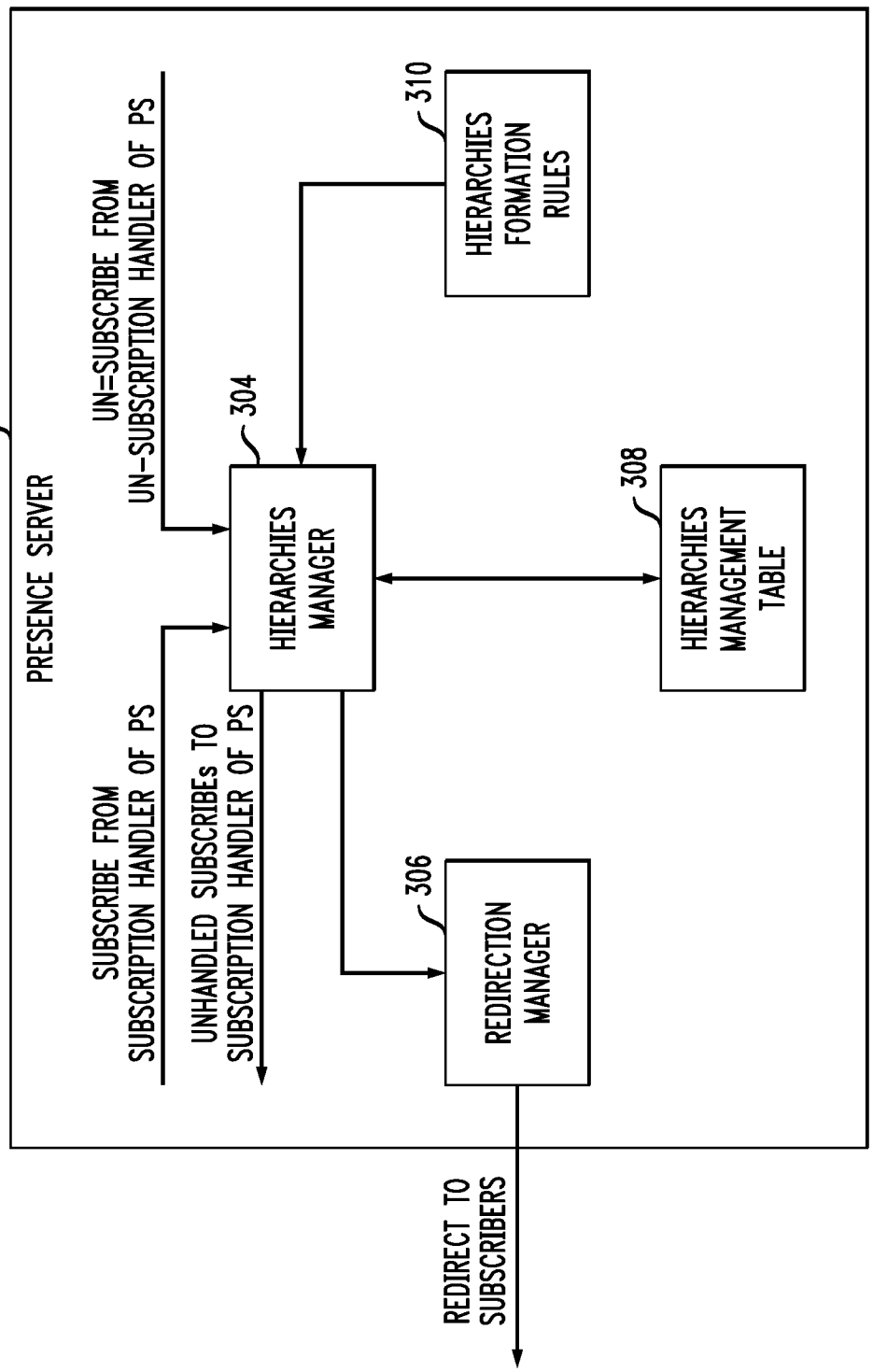
FIG. 3 is a diagram illustrating modules within a presence server, according to an embodiment of the present invention.

FIG. 3 is a diagram illustrating modules within a presence server 302, according to an embodiment of the present invention. By way of illustration, FIG. 3 depicts a hierarchies manager module 304, a redirection manager 306, a hierarchies formation rules module 310 and a hierarchies management table module 308. As depicted in FIG. 3 (and detailed herein), PS 302 receives a SUBSCRIBE message from a subscription handler of the PS. If it is the very first subscription request for a presentity or resource list, the PS handles the request normally; that is, the PS processes the subscription, makes necessary entries in its data structures and sends a response back to the subscriber/watcher in the form of a NOTIFY message. If at least one subscription request for the specified presentity or resource list already exists, the request is handed over to the hierarchies manager module 304.

The hierarchies manager module 304 searches a database in the hierarchies formation rules module 310 and determines if the subscription satisfies any of the rules therein. If the subscription request happens to satisfy a rule, the existing subscriber is chosen by consulting hierarchies management table module 308. Such a step involves finding the correct hierarchy and correct place within that hierarchy. The hierarchies manager module 304 interacts with the redirection manager module 306 to send out a REDIRECT message to the chosen subscriber. In the case that the subscription does not fulfill any rule, the request is sent back to the subscription handler of the PS to be processed normally.

As also depicted in FIG. 3, the PS can receive an Un-SUBSCRIBE request. In such an instance, the PS determines if the request is to be processed normally or needs to be handed over to hierarchies manager module 304. If an affected uniform resource identifier (URI) is part of any hierarchy, the hierarchies manager module 304 handles the unsubscription request. Accordingly, hierarchies manager module 304 searches within the hierarchies management table module 308 and identifies all subscribers who have subscriptions to an unsubscribed subscriber and determines possible nodes in the hierarchy to whom each may subscribe. The hierarchies manager module then redirects all of the affected subscribers to a new URI and updates the hierarchies management table in module 308 with new information; that is, reorganizes the hierarchy.

Figure 4:
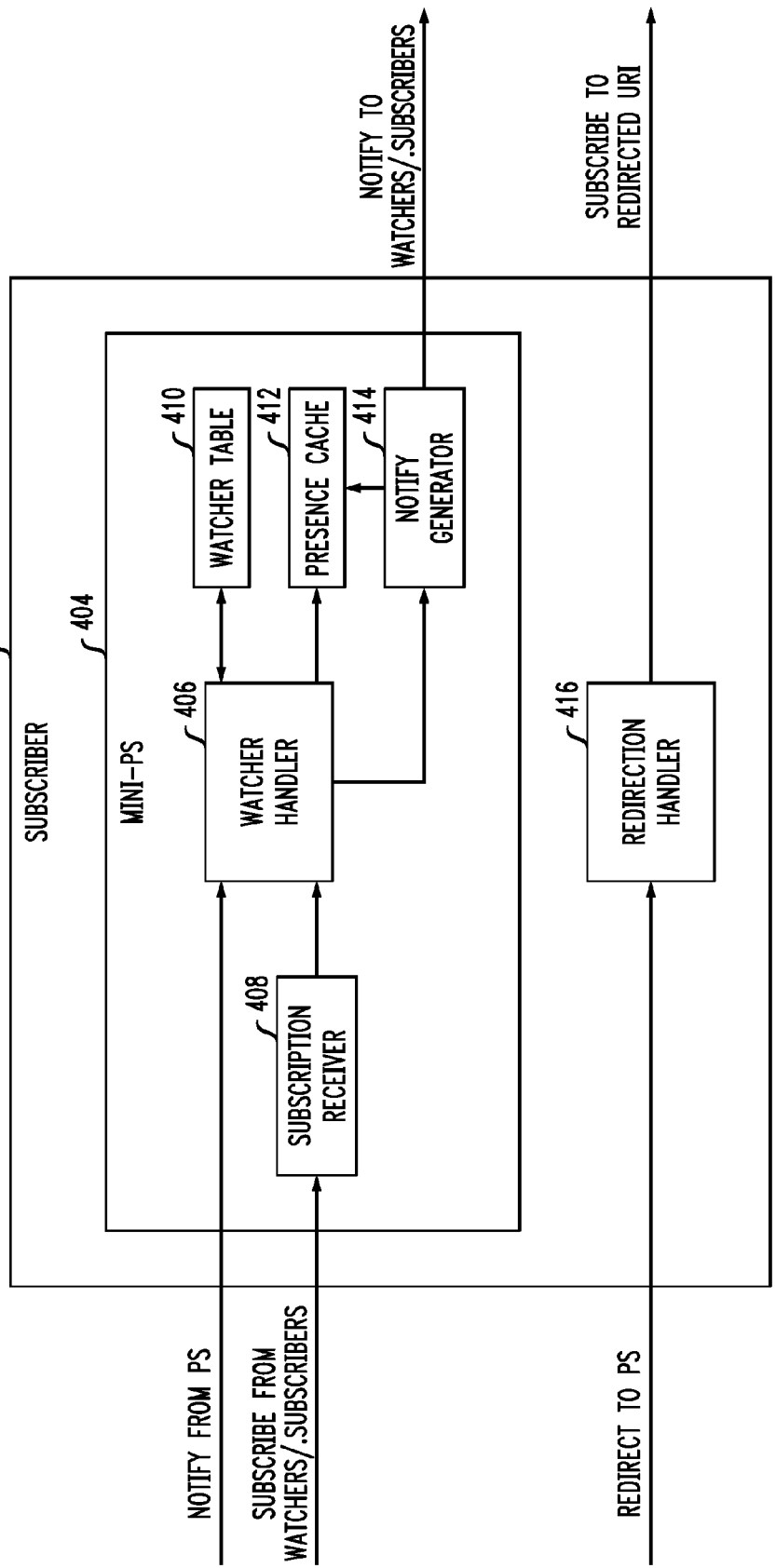
FIG. 4 is a diagram illustrating modules within a subscriber component, according to an embodiment of the present invention.

FIG. 4 is a diagram illustrating modules within a subscriber component 402, according to an embodiment of the present invention. By way of illustration, FIG. 4 depicts a mini-PS 404 within the subscriber 402. The mini-PS 404 includes a watcher handler module 406, a subscription receiver module 408, a watcher table module 410, a presence cache module 412 and a notify generator module 414. As also depicted in FIG. 4, the subscriber component 402 additionally includes a redirection handler module 416.

As illustrated in FIG. 4, the subscriber component 402 receives a REDIRECT message from the presence server via the redirection handler module 416, and sends out a new subscription request to a redirected session initiation protocol (SIP) URI. When the subscriber component 402 receives a new SUBSCRIBE message via the subscription receiver module 408, the subscriber component implies that it is to act like a mini-PS (depicted by component 404). The subscriber now handles the subscription requests; that is, in order to perform the role of mini-PS, the subscriber processes the SUBSCRIBE message, inserts a new entry in the watcher table for new subscription, and if there is presence information corresponding to subscribed presentity in the presence cache of the subscriber, sends out a notification. The subscription receiver module 408 listens for the new SUBSCRIBE request and transfers the request to the watcher handler module 406.

The watcher handler module 406 distinguishes between the new subscriptions, subscription refresh and un-subscription requests. Note that a SUBSCRIBE message with zero expiry time is the un-subscription request. For new subscriptions, the watcher handler module 406 creates a new entry in the watcher table 410 (a presentity, watcher pair), and sends out a NOTIFY message. For refresh requests, the watcher handler module 406 updates the expiry time of the subscription requests in the watcher table 410. For un-subscribe requests, the watcher handler module 406 deletes the entry from the watcher table 410 and sends out a NOTIFY message. On receipt of a NOTIFY message from the PS, the watcher handler module 406 updates the presence cache 412 and triggers the notify generator module 414 to send out notifications to affected watchers.

As detailed herein, in accordance with an aspect of the invention, subscription hierarchies are created and managed autonomously. Also, subscription hierarchies can be dynamic in nature and grow as new subscriptions are added and shrink as subscriptions expire. In at least one embodiment of the invention, a presence server is the single controller of the subscription hierarchies and subscribers are nodes in the hierarchy. Additionally, the techniques described herein aid in reducing notify message processing load from a presence server.

Figure 5:
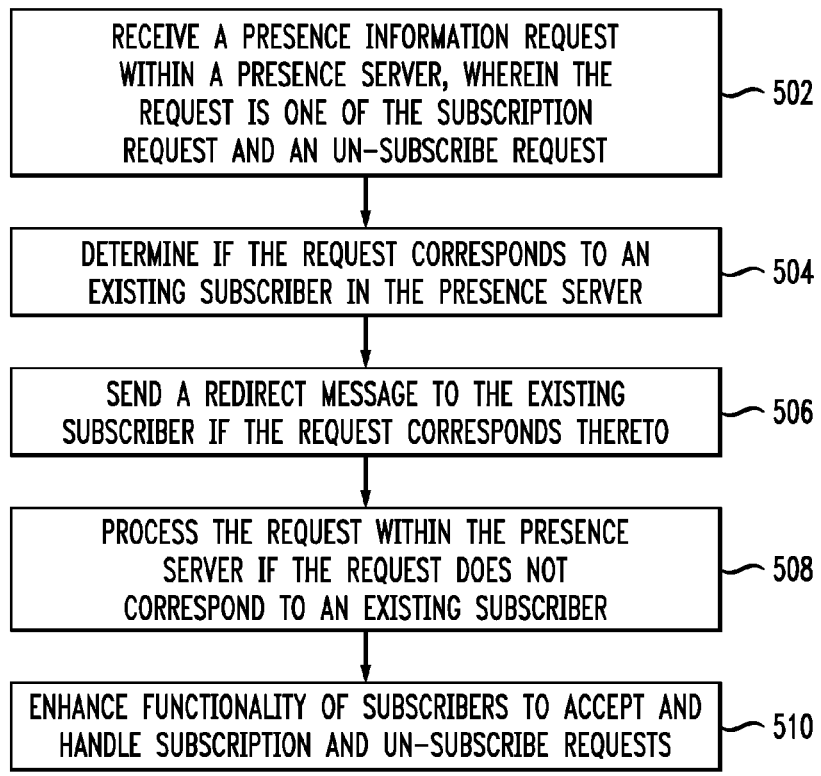
FIG. 5 is a flow diagram illustrating techniques for managing a subscription hierarchy in a presence system, according to an embodiment of the invention.

FIG. 5 is a flow diagram illustrating techniques for managing a subscription hierarchy in a presence system, according to an embodiment of the present invention. Step 502 includes receiving a presence information request within a presence server, wherein the request is one of a subscription request and an un-subscribe request.

Step 504 includes determining if the request corresponds to an existing subscriber in the presence server. The determining step can include searching a database within the presence server to determine if the subscription request satisfies a rule of the presence server. Additionally, at least one embodiment of the invention includes determining a correct hierarchy and a correct place within the hierarchy to identify the existing subscriber if the subscription request satisfies a rule.

Step 506 includes sending a redirect message to the existing subscriber if the request corresponds thereto. At least one embodiment of the invention includes sending a new subscription request to a redirected session initiation protocol uniform resource identifier in response to the subscribe message.

Step 508 includes processing the request within the presence server if the request does not correspond to an existing subscriber. Step 510 includes enhancing functionality of subscribers to accept and handle subscription and un-subscribe requests. This enhancing step can include adding a watcher handler, a subscription receiver, a redirection handler, a presence cache and a notify generator in the subscriber.

As described herein, hierarchies are maintained inside in a hierarchy management table that is indexed by a unique identifier of subscribers that handle subscription requests.

The techniques depicted in FIG. 5 can additionally include distinguishing between a new subscription request, a subscription refresh request and an un-subscribe request. At least one embodiment of the invention includes creating a new entry in a watcher table and sending a notify message in response to a new subscription request by the subscriber. As detailed herein, the watcher table is data structure indexed by a subscribed-to uniform resource identifier containing a list of all watchers on the uniform resource identifier within the subscriber. Additionally, at least one embodiment of the invention includes updating a presence cache (that is, a data structure containing presence data of the presentities) and sending a notification pertaining to presence data of an affected presentity from the presence cache to affected watchers in response to the notify message by the subscriber.

Further, at least one embodiment of the invention includes updating an expiry time of the subscription request in response to a subscription refresh request by the subscriber, as well as deleting an entry from a watcher table and sending a notify message in response to an un-subscribe request by the subscriber. Also, at least one embodiment of the invention includes updating a presence cache and sending a notification pertaining to presence data of an affected presentity from the presence cache to affected watchers in response to a new notify message received by the subscriber.

The techniques depicted in FIG. 5 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 6:
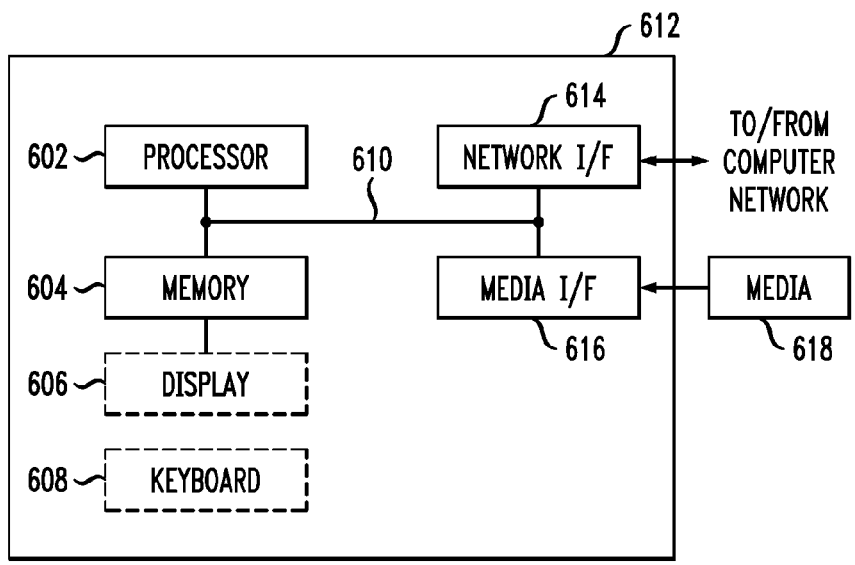
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, off-loading subscription information to lower nodes in a subscription hierarchy in presence systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a subscription hierarchy in a presence system, the method comprising:
    receiving a presence information request from a first subscriber within a presence server, wherein the request is one of a subscription request and an un-subscribe request;
    determining if the request corresponds to an existing second subscriber in the presence server;
        and if so, redirecting the request to the existing second subscriber for processing by the existing second subscriber, wherein said processing comprises:
            the existing second subscriber updating a watcher table in connection with the request; and
            the existing second subscriber emitting a notification pertaining to the request;
        and if not, processing the request within the presence server; and
    enhancing functionality of subscribers to accept and process subscription requests and un-subscribe requests to distribute a processing load among the presence server and subscribers within the presence server;
    wherein at least one of the steps is carried out by a computer device.

2. The method of claim 1, wherein said determining comprises searching a database within the presence server to determine if the subscription request satisfies a rule of the presence server.

3. The method of claim 2, comprising determining a correct hierarchy and a correct place within the hierarchy to identify the existing subscriber if the subscription request satisfies a rule.

4. The method of claim 3, wherein hierarchies are maintained inside in a hierarchy management table that is indexed by a unique identifier of subscribers that handle subscription requests.

5. The method of claim 1, comprising sending a new subscription request to a redirected session initiation protocol uniform resource identifier in response to a subscribe message.

6. The method of claim 1, wherein said enhancing comprises adding a watcher handler, a subscription receiver, a redirection handler, a presence cache and a notify generator in the subscriber.

7. The method of claim 6, comprising creating a new entry in a watcher table and sending a notify message in response to a new subscription request by the subscriber.

8. The method of claim 7, wherein the watcher table is a data structure indexed by a subscribed-to uniform resource identifier containing a list of all watchers on the uniform resource identifier within the subscriber.

9. The method of claim 6, comprising updating a presence cache and sending a notification pertaining to presence data of an affected presentity from the presence cache to affected watchers in response to the notify message by the subscriber.

10. The method of claim 6, comprising updating an expiry time of the subscription request in response to a subscription refresh request by the subscriber.

11. The method of claim 6, comprising deleting an entry from a watcher table and sending a notify message in response to an un-subscribe request by the subscriber.

12. The method of claim 11, comprising updating a presence cache and sending a notification pertaining to presence data of an affected presentity from the presence cache to affected watchers in response to a new notify message received by the subscriber.

13. An article of manufacture comprising a non-transitory computer readable storage medium having computer readable instructions tangibly embodied thereon which, when implemented, cause a computer to carry out a plurality of method steps comprising:
   receiving a presence information request from a first subscriber within a presence server, wherein the request is one of a subscription request and an un-subscribe request;
   determining if the request corresponds to an existing second subscriber in the presence server;
      and if so, redirecting the request to the existing second subscriber for processing by the existing second subscriber, wherein said processing comprises:
         the existing second subscriber updating a watcher table in connection with the request; and
         the existing second subscriber emitting a notification pertaining to the request;
      and if not, processing the request within the presence server; and
   enhancing functionality of subscribers to accept and process subscription requests and un-subscribe requests to distribute a processing load among the presence server and subscribers within the presence server.

14. The article of manufacture of claim 13, wherein the method steps comprise:
   distinguishing between a new subscription request, a subscription refresh request and an un-subscribe request.

15. The article of manufacture of claim 13, wherein the method steps comprise:
   creating a new entry in a watcher table and sending a notify message in response to a new subscription request by the subscriber.

16. The article of manufacture of claim 15, wherein the method steps comprise:
   updating a presence cache and sending a notification pertaining to presence data of an affected presentity from the presence cache to affected watchers in response to the notify message by the subscriber.

17. The article of manufacture of claim 14, wherein the method steps comprise:
   updating an expiry time of the subscription request in response to a subscription refresh request by the subscriber.

18. The article of manufacture of claim 13, wherein the method steps comprise:
   deleting an entry from a watcher table and sending a notify message in response to an un-subscribe request by the subscriber.

19. The article of manufacture of claim 13, wherein the method steps comprise:
   updating a presence cache and sending a notification pertaining to presence data of an affected presentity from the presence cache to affected watchers in response to a new notify message received by the subscriber.

20. A system for managing a subscription hierarchy in a presence system, comprising:
   a memory;
   at least one processor coupled to the memory; and
   at least one distinct software module, each distinct software module being embodied on a tangible computer-readable medium, the at least one distinct software module comprising:
      a hierarchies manager module, executing on the processor, for receiving a presence information request from a first subscriber within a presence server, wherein the request is one of a subscription request and an un-subscribe request;
      a hierarchies formation rules database module, executing on the processor, for determining if the request corresponds to an existing second subscriber in the presence server; and
      a redirection manager module, executing on the processor, for redirecting the request to the existing second subscriber for processing by the existing second subscriber if the request corresponds thereto, wherein said processing comprises:
         the existing second subscriber updating a watcher table in connection with the request; and
         the existing second subscriber emitting a notification pertaining to the request.

* * * * *